US012554344B1

(12) United States Patent
Luhahi

(10) Patent No.: US 12,554,344 B1
(45) Date of Patent: Feb. 17, 2026

(54) SNAP-IN KNOB FOR AN APPLIANCE CONSOLE

(71) Applicant: WHIRLPOOL CORPORATION, Benton Harbor, MI (US)

(72) Inventor: Ndjeka K. Luhahi, Grand Rapids, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/901,748

(22) Filed: Sep. 30, 2024

(51) Int. Cl.
*G06F 3/0362* (2013.01)

(52) U.S. Cl.
CPC .................................. *G06F 3/0362* (2013.01)

(58) Field of Classification Search
CPC ..................................................... G06F 3/0362
See application file for complete search history.

(56) References Cited

U.S. PATENT DOCUMENTS

| | | | |
|---|---|---|---|
| 8,438,878 B2 | 5/2013 | Choi et al. | |
| 9,127,390 B2 | 9/2015 | Kim et al. | |
| 10,358,761 B2 | 7/2019 | De Luca | |
| 10,920,357 B2 | 2/2021 | Kim et al. | |
| 11,429,209 B2 | 8/2022 | Huang et al. | |
| 2021/0005403 A1 | 1/2021 | Huang et al. | |
| 2021/0296064 A1 * | 9/2021 | Anderson | H01H 3/10 |
| 2023/0258338 A1 * | 8/2023 | Zaprzalka | A47J 37/0786 99/468 |
| 2023/0349088 A1 | 11/2023 | Aurora et al. | |

FOREIGN PATENT DOCUMENTS

| | | | |
|---|---|---|---|
| CN | 106968085 | A | 7/2017 |
| CN | 113737467 | A | 12/2021 |
| CN | 111534976 | B | 12/2023 |
| EP | 3516103 | A1 | 7/2019 |
| EP | 4187009 | A1 | 5/2023 |
| WO | 2017152945 | A1 | 9/2017 |

* cited by examiner

*Primary Examiner* — Hang Lin
(74) *Attorney, Agent, or Firm* — Price Heneveld LLP

(57) ABSTRACT

An appliance console includes a panel having a knob receiver, an encoder that is attached to a back side of the panel and extends through the panel to partially define the knob receiver, and a knob having a perimeter wall and a central hub. The central hub attaches to the knob receiver. The knob is rotationally operable and axially fixed relative to the knob receiver. Engagement of the knob receiver with the central hub prevents detachment of the knob from the knob receiver, the knob receiver is further defined by a rib that projects from a front surface of the panel, and the perimeter wall and the rib cooperate to define a flow path that directs fluid around the knob receiver and to an area below the rib. The rib and the perimeter wall cooperate to prevent infiltration of the fluid into the knob receiver.

20 Claims, 10 Drawing Sheets

SNAP-IN KNOB FOR AN APPLIANCE CONSOLE

BACKGROUND OF THE DISCLOSURE

The present disclosure generally relates to controls for appliances, and more specifically, a snap-in knob for an appliance console that includes a non-separable interface for attaching the knob to the console.

SUMMARY OF THE DISCLOSURE

According to one aspect of the present disclosure, an appliance console includes a panel having a knob receiver, an encoder that is attached to a back side of the panel and extends through the panel to partially define the knob receiver, and a knob having a perimeter wall and a central hub. The central hub attaches to the knob receiver. The knob is rotationally operable and axially fixed relative to the knob receiver. Engagement of the knob receiver with the central hub prevents detachment of the knob from the knob receiver, the knob receiver is further defined by a rib that projects from a front surface of the panel, and the perimeter wall and the rib cooperate to define a flow path that directs fluid around the knob receiver and to an area below the rib. Further, the rib and the perimeter wall cooperate to prevent infiltration of the fluid into the knob receiver.

According to another aspect of the present disclosure, a console for an appliance includes a panel having an aperture, an encoder that is attached to a back side of the panel, and a knob that includes a central hub that is attached to the encoder and the panel. The knob is rotationally operable and axially positioned relative to the panel. Engagement of the central hub of the knob with at least one of the encoder and the panel prevents detachment of the knob from the panel, the knob includes a perimeter wall, the panel includes a rib that projects from a front surface of the panel, and the perimeter wall and the rib cooperate to define a labyrinth seal that prevents infiltration of fluid onto an area of the panel between the rib and the aperture.

According to yet another aspect of the present disclosure, an appliance console includes a panel having an aperture, an encoder that is attached to a back side of the panel and extends through the aperture, a knob having a perimeter wall and a central hub, and a weighted disk. The central hub receives the encoder and is axially secured to the aperture. The knob is rotationally operable relative to the panel for operating the encoder. The weighted disk is attached to the knob between the perimeter wall and the central hub to increase the inertia of the knob. The panel includes a rib that projects from a front surface of the panel, and the perimeter wall and the rib cooperate to define a flow path that directs fluid around the perimeter wall and to an area below the perimeter wall and prevents infiltration of the fluid onto an area of the panel between the rib and the aperture.

These and other features, advantages, and objects of the present disclosure will be further understood and appreciated by those skilled in the art by reference to the following specification, claims, and appended drawings.

Figure 1:
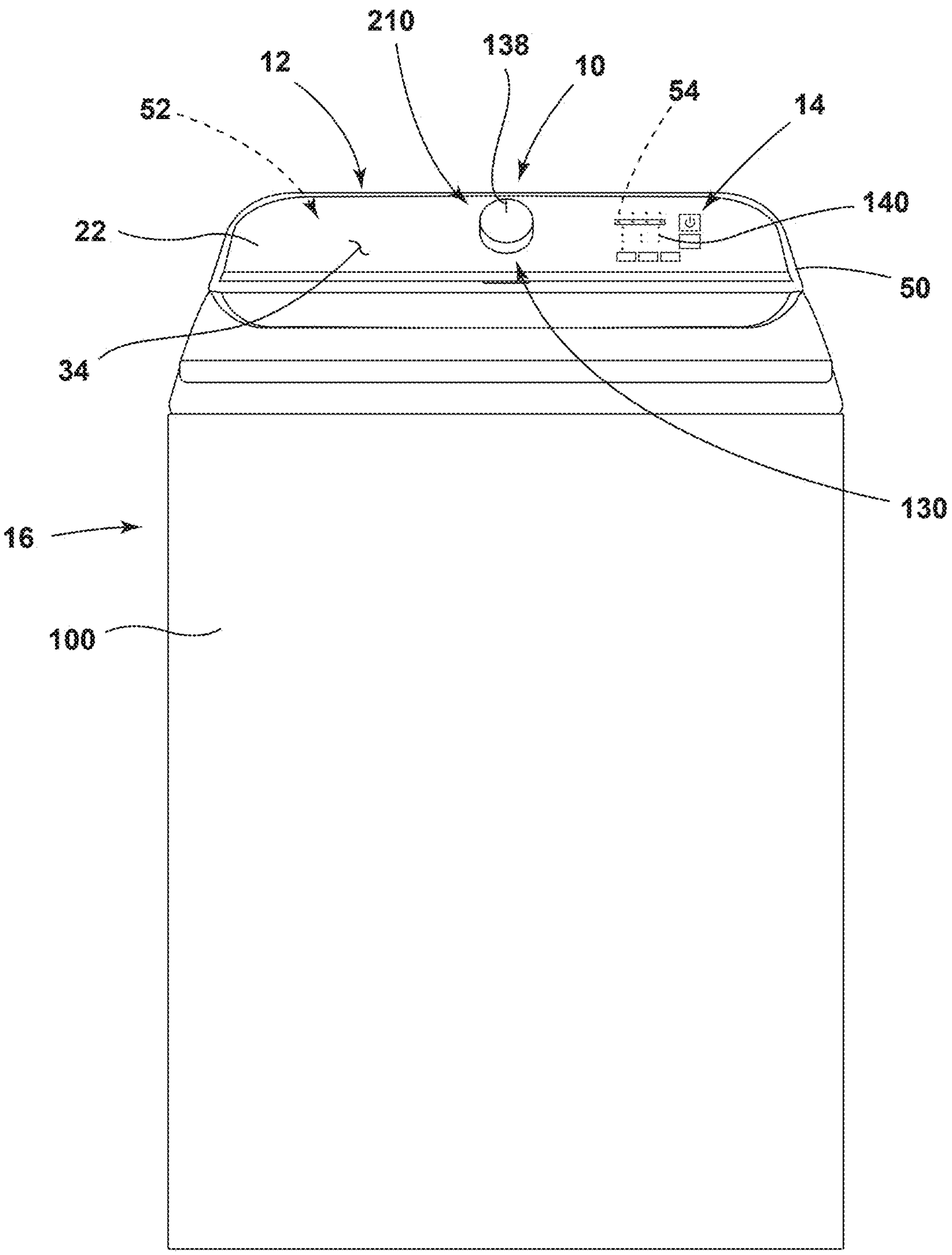
FIG. 1 is a front perspective view of an appliance cabinet having a console that incorporates an aspect of a snap-in knob.
Figure 2:
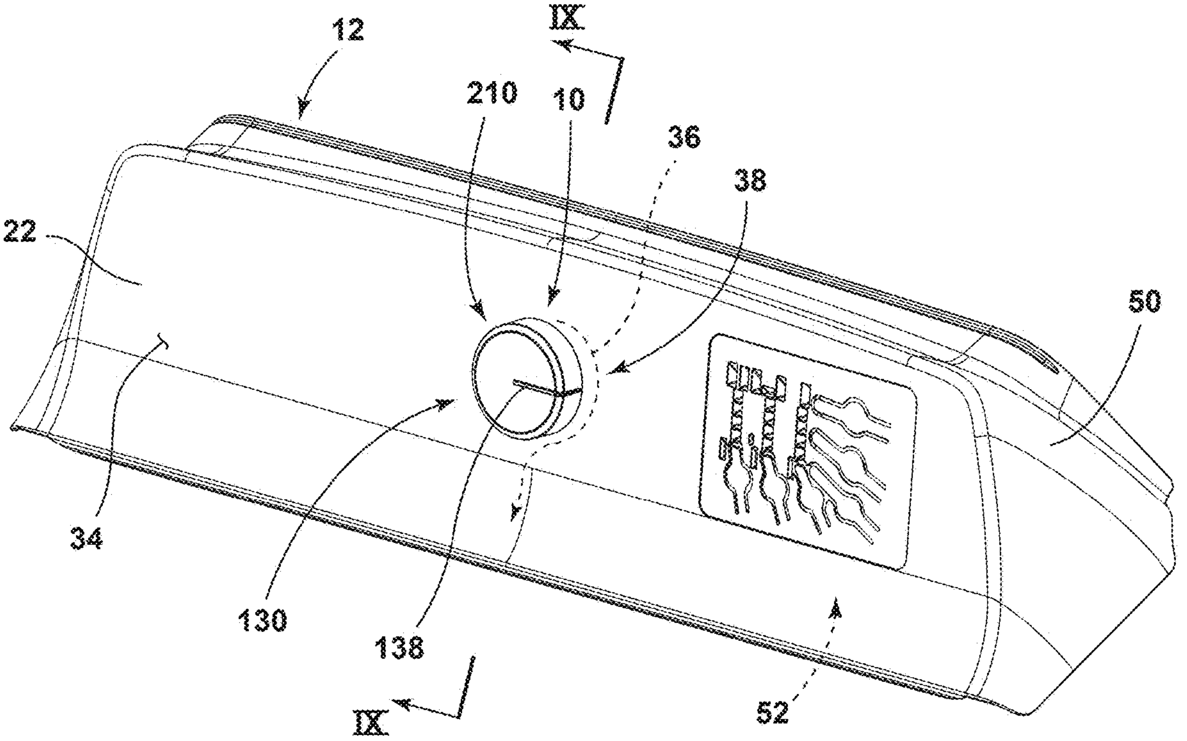
FIG. 2 is a perspective view of the console incorporating an aspect of the snap-in knob.
Figure 3:
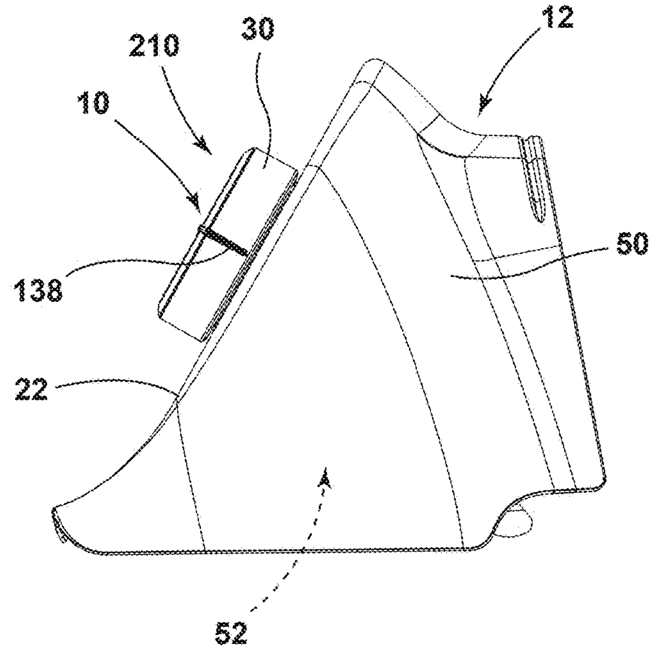
FIG. 3 is a side elevation view of the console of FIG. 2.
Figure 4:
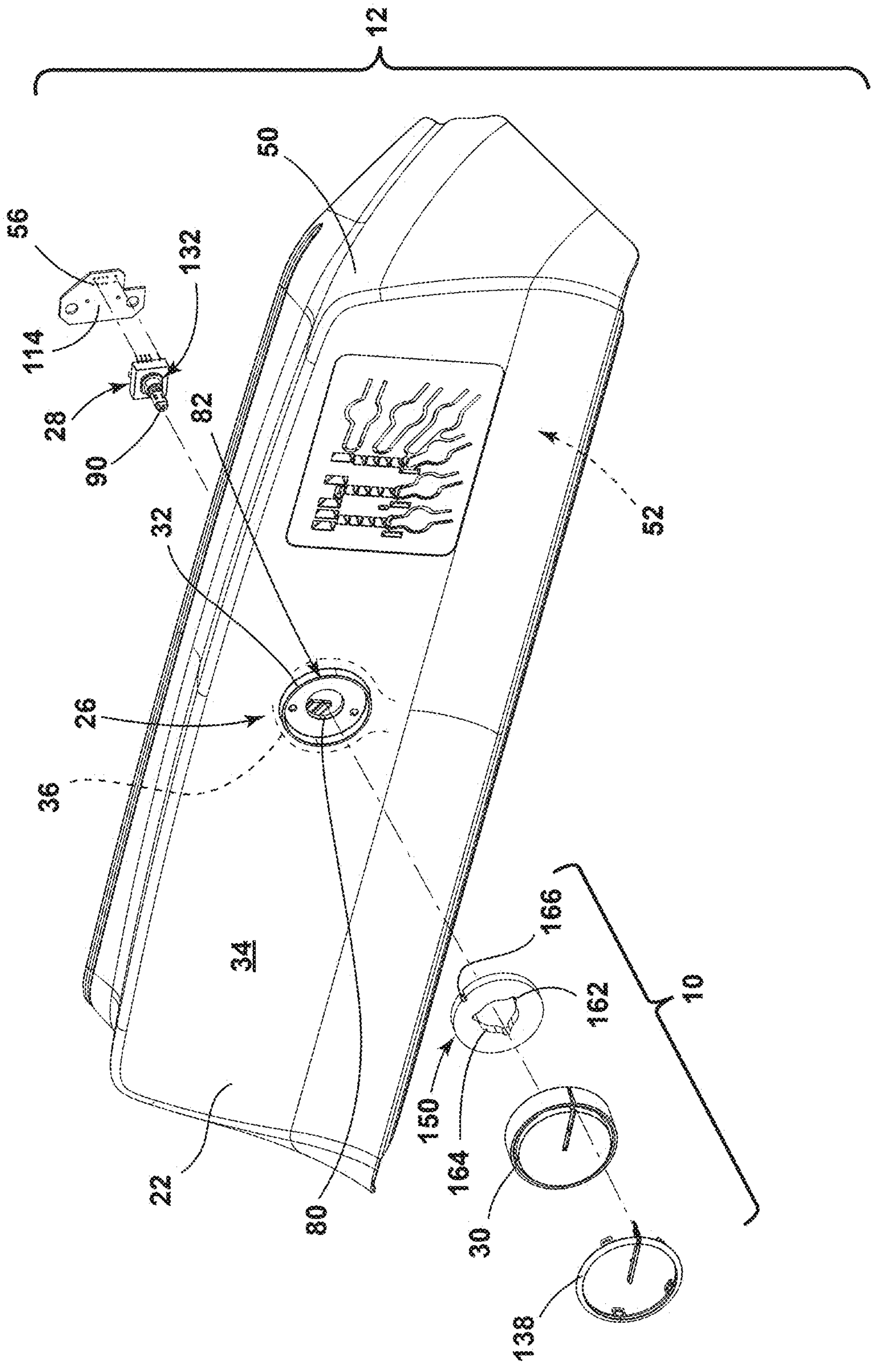
FIG. 4 is an exploded perspective view of the console of FIG. 2.
Figure 5:
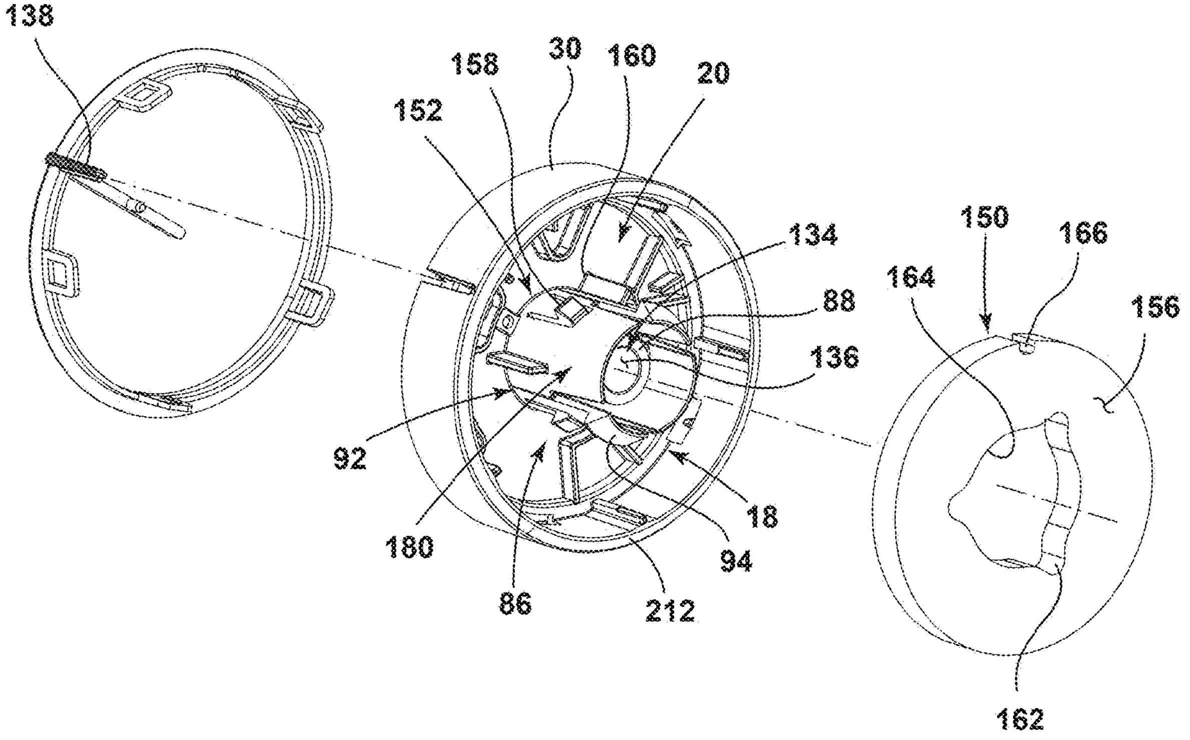
FIG. 5 is an exploded perspective view of the snap-in knob for attaching to the appliance console.
Figure 6:
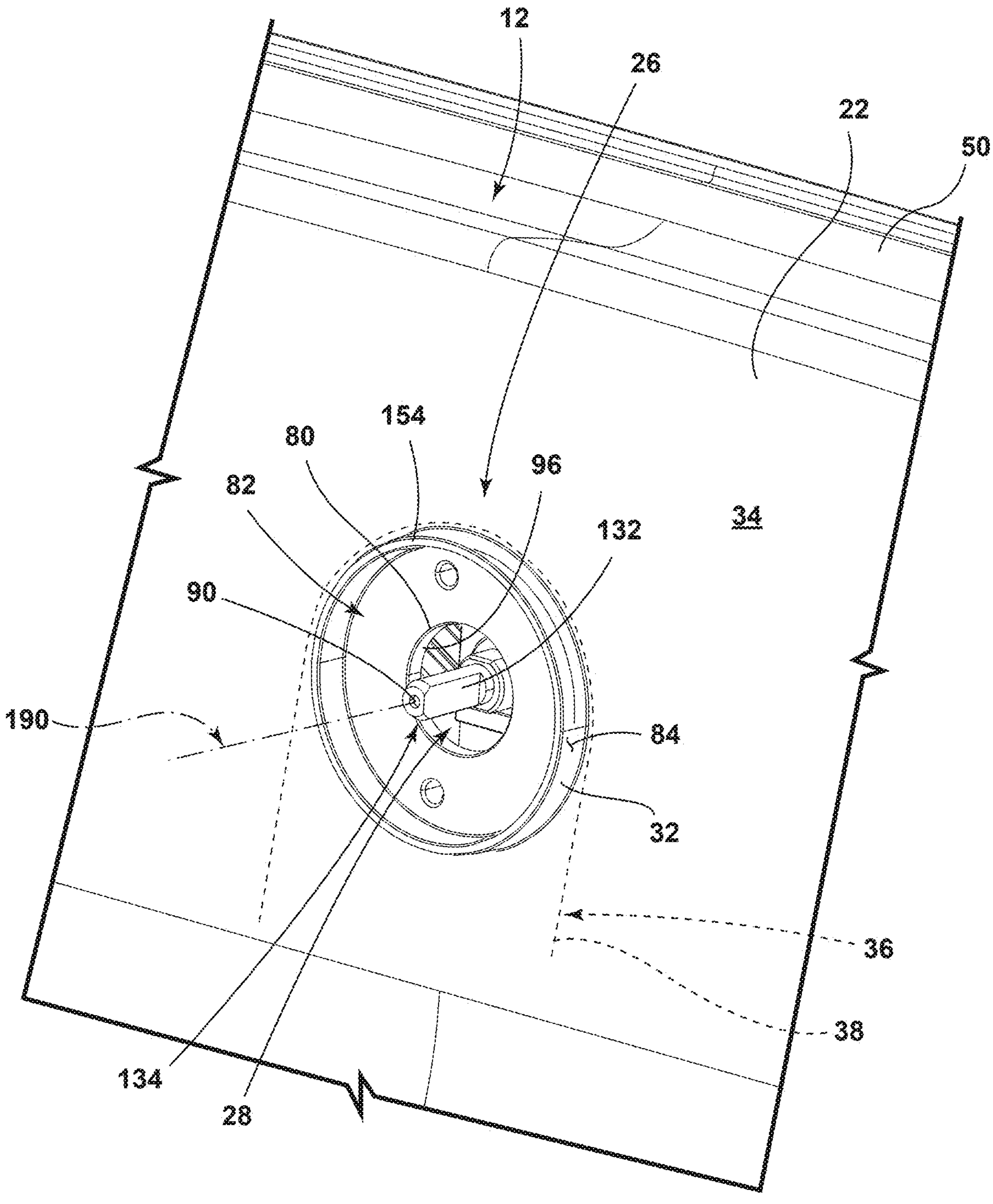
FIG. 6 is an enlarged perspective view of the console of FIG. 4 and showing a knob receiver.
Figure 7:
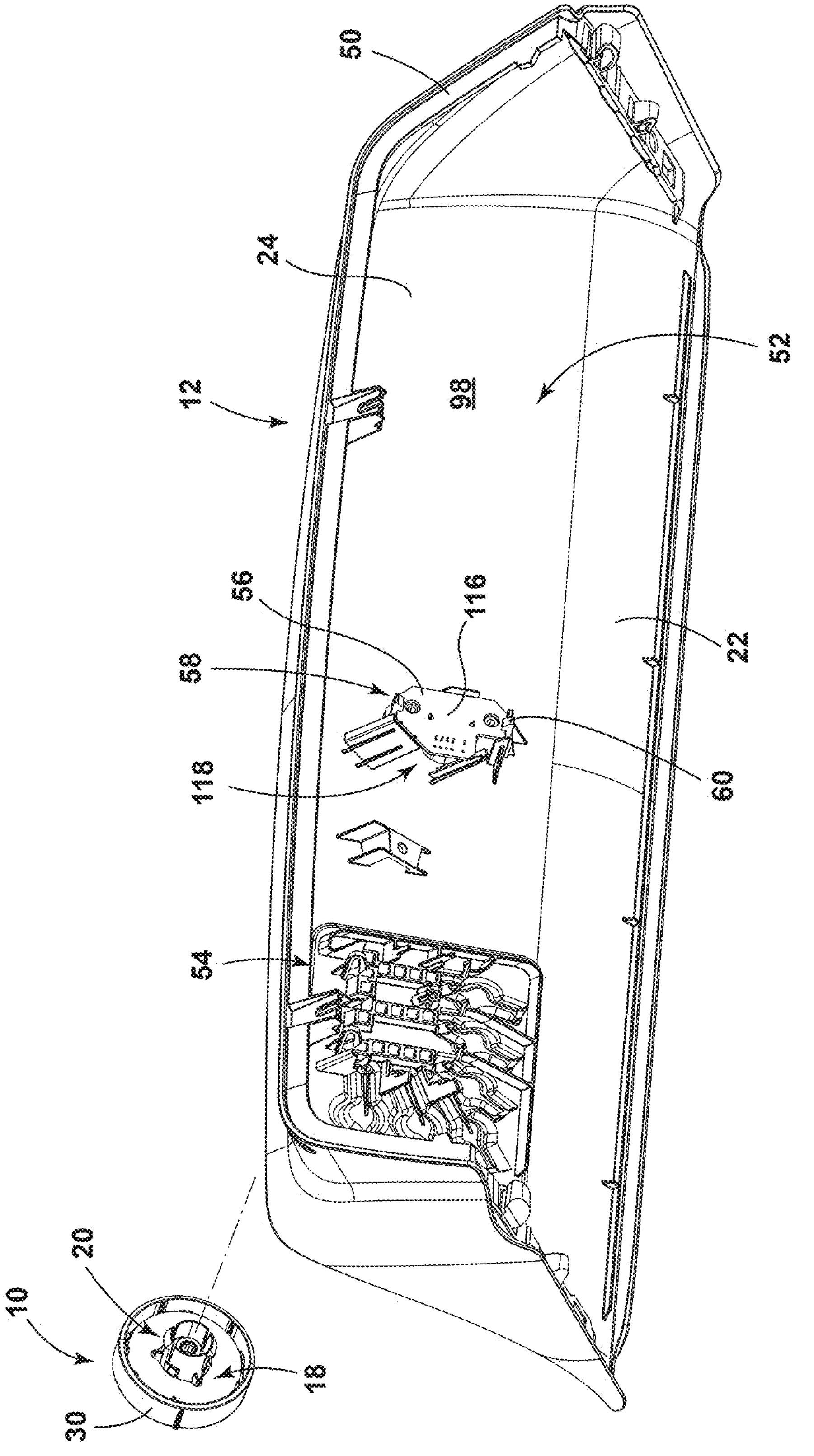
FIG. 7 is a rear exploded perspective view of the console of FIG. 2 and showing an encoder and printed circuit board attached to a back side of the console.
Figure 8:
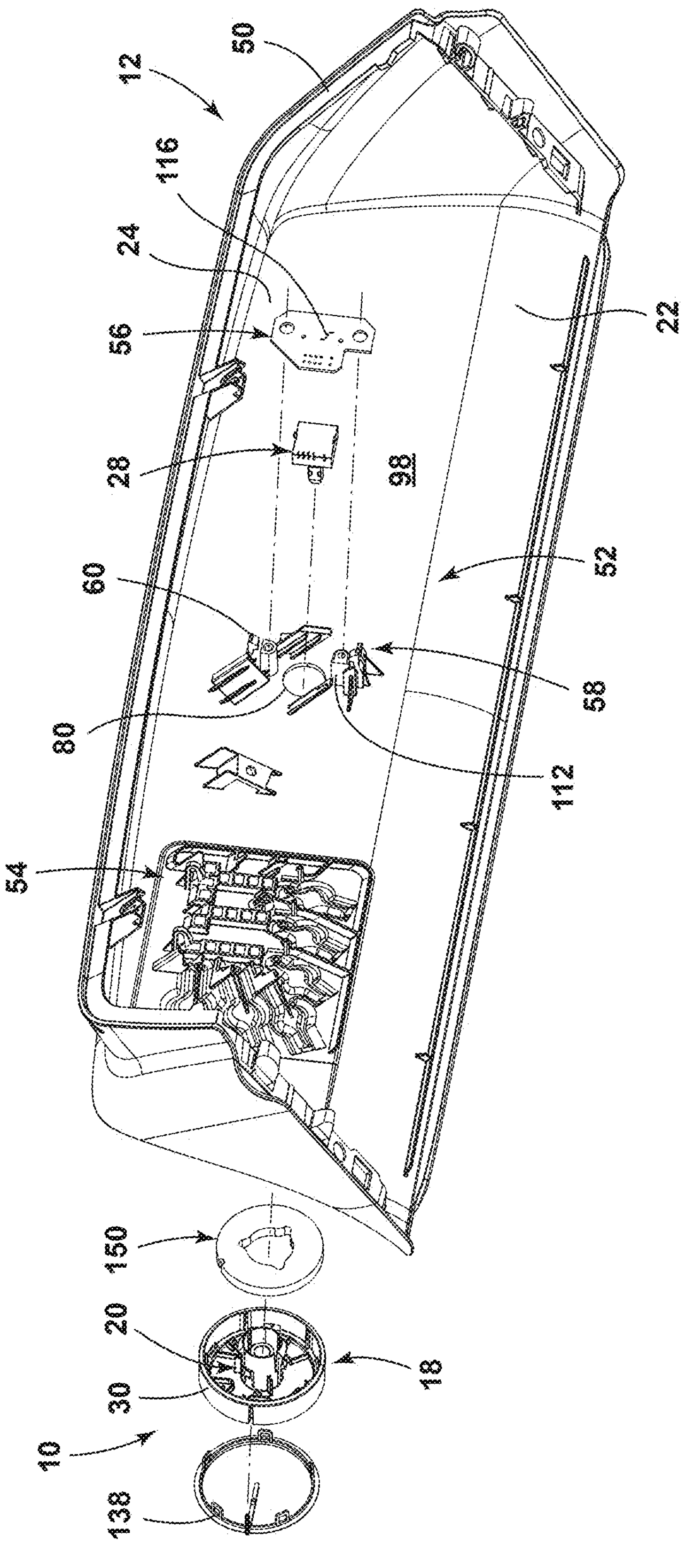
FIG. 8 is a further exploded perspective view of the console of FIG. 7.

The components in the figures are not necessarily to scale, emphasis instead being placed upon illustrating the principles described herein.

DETAILED DESCRIPTION

The present illustrated embodiments reside primarily in combinations of method steps and apparatus components related to a snap-in knob for an appliance console. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-11, reference numeral 10 generally refers to a knob for a console 12 that operates as part of a user interface 14 for an appliance 16. The knob 10 includes a snap-in feature 18 incorporated within a central hub 20 of the knob 10. The snap-in feature 18 attaches the knob 10 to a front panel 22 of the console 12 such that the knob 10 is not removable from the console 12 without disassembly of the console 12 to access a back side 24 of the front panel 22 of the console 12. According to various aspects of the device, the console 12 includes the front panel 22 having a knob receiver 26. An encoder 28 is attached to the back side 24 of the front panel 22 and extends through the front panel 22 that partially defines the knob receiver 26. The knob 10 includes a perimeter wall 30 and the central hub 20. The central hub 20 attaches to the knob receiver 26. The knob 10 is rotationally operable and axially fixed relative to the knob receiver 26. Engagement of the knob receiver 26 with the central hub 20 prevents detachment of the knob 10 from the knob receiver 26. In this manner, the knob 10 is capable of separation from the knob receiver 26 only by accessing the central hub 20 from the back side 24 of the front panel 22. The knob receiver 26 is also defined by a rib 32 that projects from a front surface 34 of the front panel 22. The perimeter wall 30 of the knob 10 and the rib 32 of the front panel 22 cooperate to define a flow path 36 that directs fluid 38 around the knob receiver 26 into an area below the rib 32. The rib 32 and the perimeter wall 30 for the knob 10 cooperate to prevent infiltration of the fluid 38 into the knob receiver 26.

As exemplified in FIGS. 1-11, the console 12 includes the front panel 22 that is attached to a rear housing 50. The front panel 22 and the rear housing 50 cooperate to define an interior area 52 that houses electrical and electromechanical components of the console 12 for operating the user interface 14 and certain aspects of the appliance 16. One or more controllers 54 can also be included within the interior area 52 of the console 12. As described herein, the encoder 28 and a printed circuit board (PCB) 56 are attached to the back side 24 of the front panel 22, typically via a receptacle 58. This receptacle 58 is defined by various securing features that attach the PCB 56 and the encoder 28 to the front panel 22.

Referring to FIGS. 2-11, the knob receiver 26 includes the rib 32 and an aperture 80 defined within the front panel 22 that is positioned within an inner region 82 bounded by the rib 32. The rib 32 is typically a circular rib that extends outward from the front surface 34 of the front panel 22 to allow for rotational operation of the knob 10. As will be described more fully herein, the rib 32 includes an angled outer surface 84 that promotes a flow of fluid 38 toward an area of the front surface 34 outside of and below the rib 32 for the knob receiver 26. The central hub 20 of the knob 10 includes an attachment structure 86 that extends through the aperture 80 of the front panel 22. The attachment structure 86 cooperates with the knob receiver 26 and the aperture 80 of the knob receiver 26 to axially secure the knob 10 to the knob receiver 26. In this manner, the engagement of the attachment structure 86 with the aperture 80 allows for rotational operation of the knob 10 and the encoder 28. Contemporaneously, the attachment structure 86 prevents detachment of the knob 10 from the knob receiver 26.

Referring again to FIGS. 2-11, the attachment structure 86 of the knob 10 includes an inner portion 88 that receives the encoder 28. The inner portion 88 of the attachment structure 86 is axially and rotationally fixed to an encoder shaft 90 of the encoder 28 such that the knob 10 and the encoder shaft 90 rotate together. Through this configuration, the knob 10 is secured to the encoder 28 to provide for consistent and smooth operation of the encoder 28 via the engagement between the inner portion 88 of the attachment structure 86 and the encoder shaft 90. The attachment structure 86 of the knob 10 also includes an outer portion 92 that includes a plurality of resilient tabs 94. These resilient tabs 94 form a snapping engagement with the front panel 22 proximate the aperture 80.

During installation of the knob 10 onto the knob receiver 26, the resilient tabs 94 of the outer portion 92 of the attachment structure 86 extend through the aperture 80 and are biased inward as they pass through the aperture 80. Once past an inner edge 96 of the aperture 80, the tabs 94 resiliently deflect outward to engage a back surface 98 of the front panel 22. As described herein, these resilient tabs 94 engage the back surface 98 of the front panel 22 and prevent axial motion of the knob 10 such that detachment of the knob 10 cannot be accomplished without the disassembly of the front panel 22 from the rear housing 50 and/or removal of the console 12 from the remainder of a cabinet 100 (shown in FIG. 1).

Referring now to FIGS. 4-11, the perimeter wall 30 of the knob 10 and the rib 32 of the front panel 22 form a labyrinth seal 110 as well as a barrier that prevents access of liquids, debris, and other materials into the inner region 82 of the knob receiver 26 that is defined by the rib 32. Additionally, the cooperation of the perimeter wall 30 of the knob 10 and the rib 32 of the front panel 22 prevent access by the user or service technician from reaching the central hub 20 in a way that could detach the knob 10 from the knob receiver 26. Accordingly, the design of the front panel 22 having the rib 32 and the knob 10 having the perimeter wall 30 secures the knob 10 to the front panel 22 to ensure that the knob 10 is secured to the console 12 for the appliance 16 and cannot be inadvertently or accidentally removed or detached from the knob receiver 26.

Referring again to FIGS. 4-11, the encoder 28 is coupled with the PCB 56 that is then attached to the back side 24 of the front panel 22. Using the PCB 56, the attachment structure 86 of the knob 10, including the resilient tabs 94, is positioned between the PCB 56 and the back side 24 of the front panel 22. Accordingly, using this configuration, removal of the knob 10 can only be accomplished by first separating the front panel 22 from the rear housing 50 and, in certain embodiments, also separating the encoder 28 and the PCB 56 from the back side 24 of the console 12. Accordingly, as described herein, separation of the knob 10 from the front panel 22 can only be accomplished by accessing the interior area 52 of the console 12 for accessing the PCB 56, the encoder 28, and the attachment structure 86 of the knob 10.

As exemplified in FIGS. 7-11, the back side 24 of the front panel 22 includes the receptacle 58 that secures the PCB 56 and, in turn, the encoder 28 to the front panel 22. Typically, this receptacle 58 can include securing features 60, such as resilient formations that snap, retain, or otherwise secure the PCB 56 in place. The back side 24 the front panel 22 also includes a plurality of hubs 112 that position the PCB 56 a particular distance from the back side 24 of the front panel 22. Through this configuration, the hubs 112, which engage a first side 114 of the PCB 56, and the securing features 60 of the receptacle 58, which engage a second side 116 of the PCB 56, cooperate to receive the PCB 56 and position the PCB 56 in a desired position 118 relative to the aperture 80 and the knob receiver 26. Because the encoder 28 is attached to the PCB 56, the receptacle 58 defined within the back side 24 of the front panel 22 also positions the encoder 28 relative to the aperture 80. By positioning the encoder 28 relative to the aperture 80, installation of the knob 10 ensures that the knob 10 is appropriately attached to the encoder shaft 90 and secured thereto for smooth and consistent operation of the knob 10, the encoder shaft 90, and the interior components of the encoder 28.

In certain aspects of the device, the securing features 60 of the receptacle 58 cooperate with the PCB 56 to ensure a particular rotational orientation 130 of the PCB 56 and the encoder 28 with respect to the receptacle 58 and the aperture 80. The encoder shaft 90 typically includes an outer profile 132 having a flat portion, tab, or other similar interference feature 134 that cooperates with an inner surface 136 of the inner portion 88 of the central hub 20 of the knob 10 to ensure unified rotation of the knob 10 and encoder shaft 90. This design also dictates that the knob 10 and an indicator 138 of the knob 10 should align with relevant indicia 140 on the front panel 22. To place the encoder shaft 90 at the proper orientation, the PCB 56 can cooperate with the securing features 60 of the receptacle 58 to position the PCB 56, the encoder 28, and the encoder shaft 90 at a desired rotational orientation 130 to ensure that the knob 10, and an indicator 138 or indicia 140 therefor, are properly aligned with corresponding indicia 140 defined within, or applied to, the front surface 34 of the front panel 22.

Referring again to FIGS. 4-11, a weighted disk 150 is attached to an underside of the knob 10. This weighted disk 150 is positioned within a seat 152 that is located between the perimeter wall 30 and the central hub 20. When the knob 10 is installed onto the knob receiver 26, the weighted disk 150 is positioned proximate a top edge 154 of the rib 32. This positioning provides a close engagement between a bottom surface 156 of the weighted disk 150 and the top edge 154 of the rib 32 to further prevent infiltration of fluid 38, and also prevent access by the user, into the inner region 82 of the knob receiver 26 by the rib 32. The inner portion 88 of the central hub 20 includes supplemental tabs 158 that partially define the seat 152 and that are used to secure the weighted disk 150 within the seat 152 defined by the underside of the knob 10. This seat 152 also includes aligning ribs 160 that project outward from the central hub 20. These aligning ribs 160 cooperate with undulations 162 formed within an inner perimeter 164 of the weighted disk 150 to properly align the weighted disk 150 within the seat 152 of the knob 10. An outer edge of the weighted disk 150 can also include a notch 166 that can be used to align the weighted disk 150 with respect to an applied indicator 138 that is attached to the knob 10.

Referring again to FIGS. 4-11, it is contemplated that the resilient tabs 94 and the supplemental tabs 158 can be located at a similar distance from a rotational axis 190 of the knob 10. In this manner, the inner perimeter 164 of the weighted disk 150 and the inner edge 96 of the aperture 80 can include a similar dimension. Through this configuration, the outer portion 92 of the central hub 20 can be defined by a generally cylindrical wall 180 that includes the resilient tabs 94 and the supplemental tabs 158 that are defined within the generally cylindrical wall 180. The cylindrical wall 180 can include various gaps and spaces that provide for deflecting motion of the resilient tabs 94 and the supplemental tabs 158 for attaching the weighted disk 150 to the knob 10 and attaching the knob 10 to the knob receiver 26.

It is contemplated that the weighted disk 150 is attached to the knob 10 to increase the inertia of the knob 10 to provide a smooth operation of the knob 10 as it is rotated about a rotational axis 190 of the encoder shaft 90. It is contemplated that the weighted disk 150 can be manufactured to have a consistent weight that is distributed concentrically about a rotational axis 190. It is also contemplated that the weighted disk 150 can include a weighted section (not shown) that can be used to bias the knob 10 toward a particular rotational position, such as a home position or other rotational position. In such an aspect of the device, the weighted section can be used to at least partially bias the knob 10 toward the desired position 118 such that rotation of the knob 10 includes a feel of being rotationally assisted to the home position or other desired rotational position.

Referring again to FIGS. 1-11, the console 12 for the appliance 16 includes the front panel 22 having the aperture 80. The encoder 28 is attached to the back side 24 of the front panel 22 such that an encoder shaft 90 of the encoder 28 is positioned in alignment with the aperture 80. The knob 10 includes the central hub 20 that is attached to the encoder 28 and the front panel 22. The knob 10 is rotationally operable and axially positioned relative to the front panel 22. Engagement of the central hub 20 of the knob 10 with at least one of the encoder 28 and the front panel 22 prevents detachment of the knob 10 from the front panel 22. Through this configuration, the knob 10 is only capable of separation from the front panel 22 by accessing the central hub 20 from the back side 24 of the front panel 22. The knob 10 includes the perimeter wall 30 and the front panel 22 includes the rib 32 that projects from the front surface 34 of the front panel 22. The perimeter wall 30 and the rib 32 cooperate to define the labyrinth seal 110 to prevent infiltration of fluid 38 into an area of the front panel 22 between the rib 32 and the aperture 80. As discussed herein, the area defined by the rib 32 and positioned by and within the rib 32 at least partially defines the knob receiver 26.

The encoder 28 is coupled with the PCB 56. The central hub 20 of the knob 10 includes the resilient tabs 94 that attach to the aperture 80. The plurality of resilient tabs 94 are positioned between the PCB 56 and the back side 24 of the front panel 22. According to various aspects of the device, the resilient tabs 94 of the central hub 20 for the knob 10 can attach to other components of the front panel 22 and/or the encoder 28 to secure the knob 10 in an installed position 210 relative to the front panel 22 and the encoder 28. Where the resilient tabs 94 attach to the encoder 28, these resilient tabs 94 may be positioned proximate the front surface 34 of the front panel 22 or may extend through the aperture 80 to engage corresponding features of the encoder 28 as well as corresponding features defined within a portion of the front panel 22. In each of these configurations, it is contemplated that the resilient tabs 94 of the central hub 20 are positioned within the barrier or labyrinth seal 110 defined by the perimeter wall 30 of the knob 10 and the rib 32 of the front panel 22 to prevent access to these resilient tabs 94. Accordingly, access to the resilient tabs 94 for separation of the knob 10 from the front panel 22 can be accomplished only by accessing the interior area 52 of the console 12. Accordingly, the knob 10 is separated from the knob receiver 26 by separating the front panel 22 from the rear housing 50, and, in certain aspects of the device, by also separating the PCB 56 and the encoder 28 from the front panel 22, for providing access to the resilient tabs 94.

Referring again to FIGS. 1-11, after the knob 10 is in the installed position 210 relative to the front panel 22, cleaning of the front panel 22 and the knob 10 can be accomplished by using small amounts of fluid 38 within and around the area of the knob 10. This fluid 38 can flow under the perimeter wall 30 of the knob 10 and engage an outer surface 84 of the rib 32. The configuration of the rib 32 directs fluid 38 that passes under the perimeter wall 30 to flow around the perimeter wall 30 and away from the inner region 82 of the knob receiver 26. Typically, a bottom edge 212 of the perimeter wall 30 is in a close engagement with the front surface 34 of the front panel 22. Accordingly, only small amounts of fluid 38 that may be intentionally or unintentionally disposed on the front panel 22 are permitted to pass under the perimeter wall 30 of the knob 10. The limited amounts of fluid 38 that do pass under the bottom edge 212 of the perimeter wall 30 are then redirected by the rib 32 to flow around the perimeter wall 30 and to an area of the front surface 34 of the front panel 22 that is below the rib 32. Accordingly, little if any fluid 38 is able to pass into the inner region 82 of the knob receiver 26.

Figure 9:
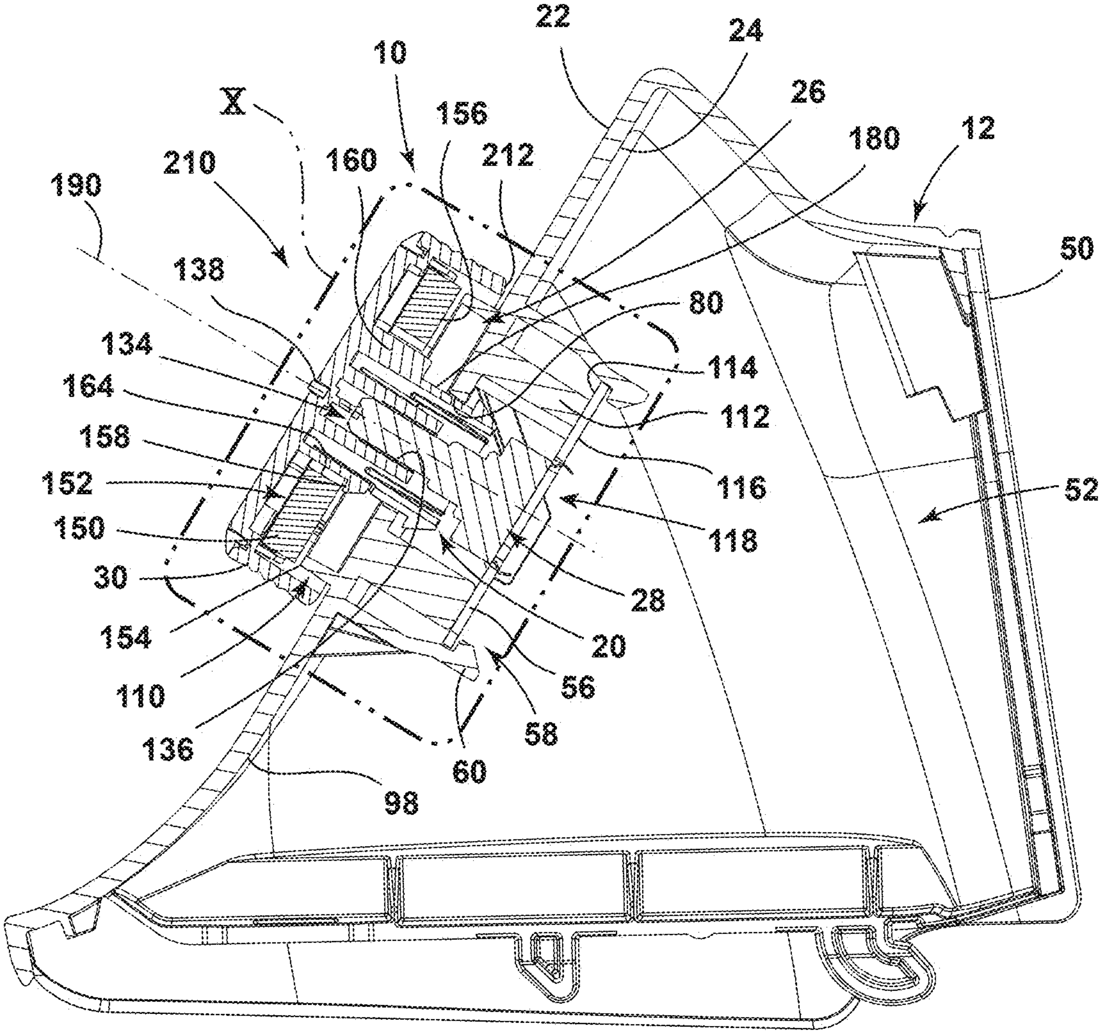
FIG. 9 is a cross-sectional view of the console of FIG. 2 taken along line IX-IX.
Figure 10:
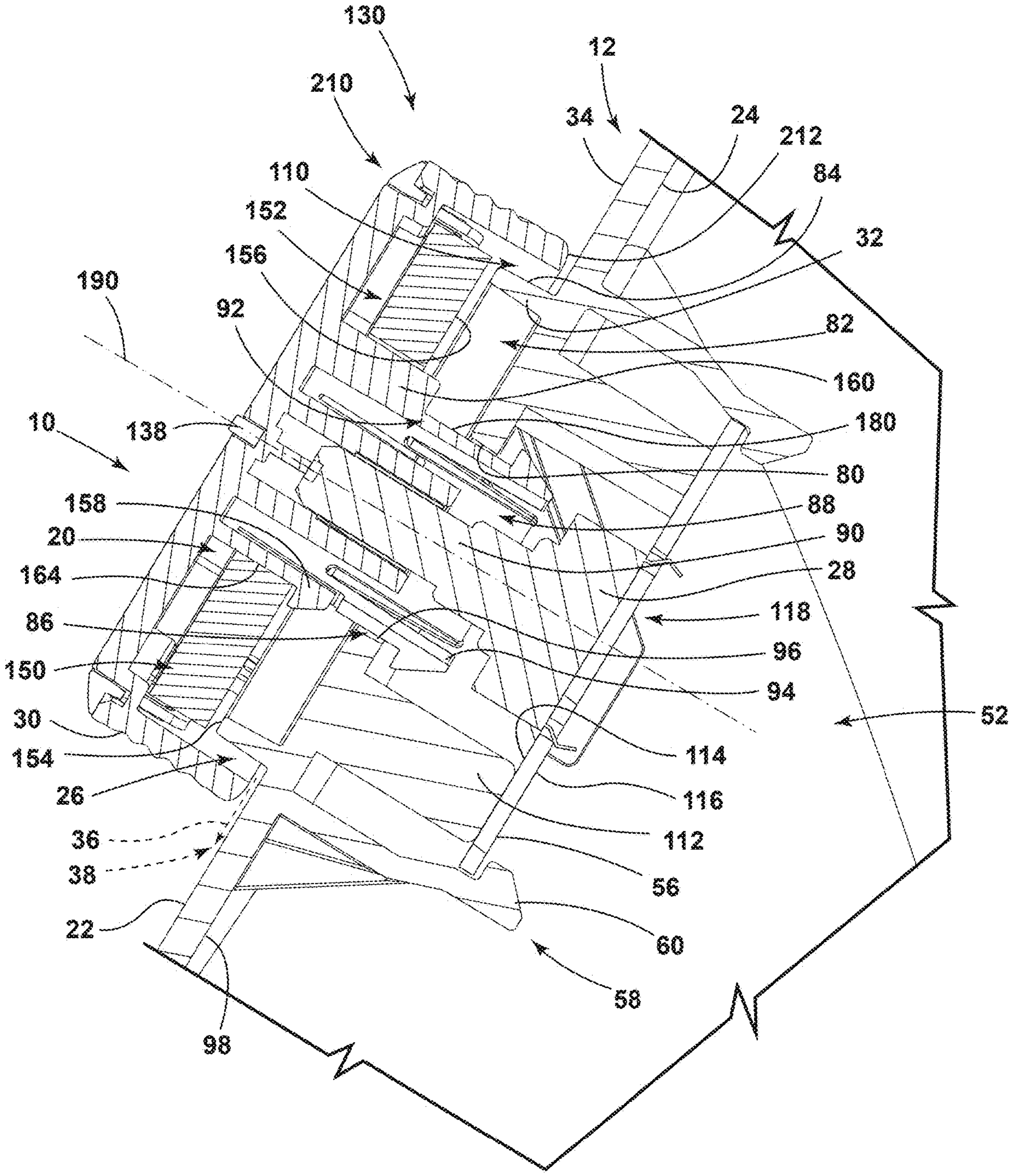
FIG. 10 is an enlarged cross-sectional view of the console of FIG. 9 taken at area X.
Figure 11:
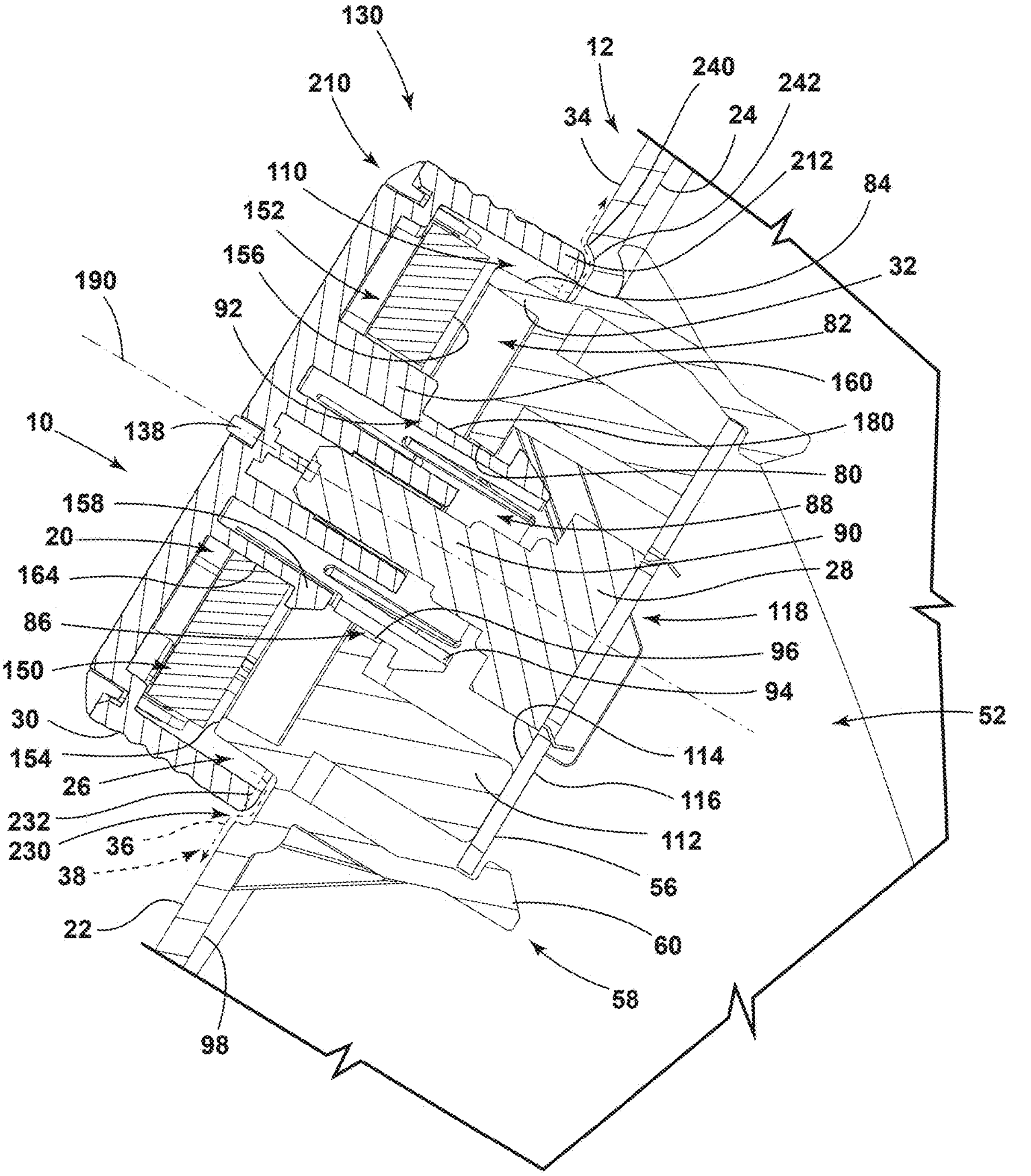
FIG. 11 is an enlarged cross-sectional view of an aspect of the console and showing interaction between the snap-in knob and the console.

Referring now to FIGS. 9-11, the perimeter wall 30, the rib 32, and the weighted disk 150 are positioned near one another to prevent access into the knob receiver 26 and also to prevent the flow of fluid 38 into the inner region 82 of the knob receiver 26. These components are positioned close to one another to prevent access, but far enough apart to prevent the effect of capillary action with respect to fluid 38 that may enter this area, either intentionally or inadvertently.

According to the various aspects of the device, the rib 32 includes the angled outer surface 84 that promotes the flow of fluid 38 around the rib 32 and outside of the inner region 82 of the knob receiver 26. In certain aspects of the device, the rib 32 may have an outer surface 84 that is perpendicular to the front surface 34 of the front panel 22 or may be angled inward to form an angle of less than perpendicular between the outer surface 84 of the rib 32 and the front surface 34 of the front panel 22.

According to various aspects of the device, as exemplified in FIGS. 1-10, the console 12 for the appliance 16 includes the front panel 22 and the aperture 80. The encoder 28 is attached to the back side 24 of the front panel 22 and extends through the aperture 80. The knob 10 includes the perimeter wall 30 of the central hub 20. The central hub 20 receives the encoder 28 and is also axially secured to the aperture 80. The knob 10, through this engagement, is rotationally operable relative to the front panel 22 for operating the encoder 28 through engagement between the central hub 20 and the encoder shaft 90. The weighted disk 150 is attached to the knob 10 within the seat 152 defined between the perimeter wall 30 of the central hub 20 to increase the rotational inertia of the knob 10 when rotated by a user. Engagement of the central hub 20 of the knob 10 with at least one of the encoder 28 and the front panel 22 prevents detachment of the knob 10 from the front panel 22. Through this engagement, the knob 10 is only capable of separation from the encoder 28 by accessing the central hub 20 from the back side 24 of the front panel 22. The front panel 22 includes the rib 32 that projects from the front surface 34 of the front panel 22. The perimeter wall 30 of the knob 10 and the rib 32 cooperate to define the flow path 36 that directs fluid 38 around the perimeter wall 30 and to an area below the knob receiver 26. The cooperation of the perimeter wall 30 and the rib 32 also operate to prevent infiltration of fluid 38 into the inner region of the front panel 22 between the rib 32 and the aperture 80.

In certain aspects of the device, as exemplified in FIG. 11, the console 12 can include a perimeter channel 230 that is positioned around the rib 32 and in alignment with the perimeter wall 30 of the knob 10. In this configuration, the bottom edge 212 of the perimeter wall 30 extends into the perimeter channel 230 when the knob 10 is in the installed position 210 relative to the knob receiver 26. In the installed position 210, the bottom edge 212 of the perimeter wall 30 is within the perimeter channel 230 and crosses a plane 232 defined by the front surface 34 of the console 12 surrounding the perimeter channel 230. It is contemplated that the contour of the perimeter channel 230 can be in a close engagement with the bottom edge 212 of the perimeter wall 30. Through this close engagement, the bottom edge 212 of the perimeter wall 30 and the perimeter channel 230 further define the labyrinth seal 110 that is formed between the knob 10 and the knob receiver 26. As discussed herein, the close engagement between the knob 10 and the knob receiver 26 is designed to be close enough to prevent fluid 38 from inadvertently entering into the inner region 82 of the knob receiver 26. At the same time the close engagement of the knob 10 and the knob receiver 26 is far enough away to prevent the movement of fluid 38 through capillary action.

The configuration of the perimeter channel 230 and the perimeter wall 30 extending into the perimeter channel 230 of the console 12 generates a more robust labyrinth seal 110 to prevent the intrusion of fluid 38 into the inner region 82 and into the aperture 80 of the console 12. Additionally, the close engagement of the perimeter wall 30 within the perimeter channel 230 creates an aesthetic appearance of the knob 10 being more incorporated into the front surface 34 of the console 12.

Referring again to FIG. 11, the perimeter channel 230 can define a portion of the flow path 36 for fluid 38 that may move or flow toward the knob receiver 26. Where fluid 38 does enter into the perimeter channel 230, an outer rim 240 of the perimeter channel 230 includes an angled edge 242 that allows for fluid 38 to freely flow under the bottom edge 212 of the perimeter wall 30 and over the angled edge 242 of the outer rim 240. The rib 32 of the knob receiver 26 forms an inner boundary of the perimeter channel 230 and prevents this fluid 38 from entering into the inner region 82 of the knob receiver 26. Accordingly, the rib 32 and the outer rim 240 form at least a portion of the flow path 36 through which the fluid 38 can flow along the front surface 34 of the console 12. From the perimeter channel 230, the fluid 38 is able to flow under the force of gravity to the area of the console 12 below the knob 10 and the knob receiver 26.

According to the various aspects of the device, the knob 10 and knob receiver 26 described herein can be incorporated within any one of various user interfaces 14. These user interface mechanisms can be installed on appliances, fixtures, and other similar devices. Where appliances 16 are fitted with the knob 10 and the knob receiver 26, such appliances 16 can include, but are not limited to, laundry appliances, dishwashers, countertop appliances, ovens, other cooking appliances, and other similar appliances and fixtures that utilize knobs and rotationally operated user interfaces.

As described and illustrated in FIGS. 1-11, the front panel 22 defines the knob receiver 26 for receiving the knob 10 that is positioned at an angle with respect to the horizontal or vertical line. It is contemplated that the knob 10 and knob receiver 26 can be utilized within vertical configurations, horizontal configurations, angled configurations, and other various other positional configurations therebetween. Moreover, while the knob 10 is illustrated herein, the attachment structure 86 described herein can be utilized with various rotationally operated user interface mechanisms. Such mechanisms include, but are not limited to, knobs, dials, rotary switches, rotary toggles, combinations thereof and other similar rotary user interface mechanisms.

According to the various aspects of the device, the configuration of the knob 10 and the knob receiver 26 defined by the front panel 22 provides for a secure attachment between the knob 10 and the front panel 22. This secure engagement provides for rotational operation of the knob 10 in a smooth and consistent manner. Additionally, this configuration provides a weighted feel of the knob 10 using the weighted disk 150. Further, the configuration of the rib 32 and the perimeter wall 30 cooperate to allow for cleaning of the console 12 using liquid cleaning agents, water, and other fluids. The close engagement between the front surface 34 of the front panel 22, the perimeter wall 30, the rib 32, and the weighted disk 150 provides for a labyrinth seal 110 to prevent infiltration of these fluids 38 into the inner region 82 of the knob receiver 26 defined by the rib 32. The circuitous path defined by the close engagement of the front panel 22, the perimeter wall 30, the rib 32, and the weighted disk 150 mitigates the occurrence of splashing or other flow of these fluids 38 from passing over the top edge 154 of the rib 32 and into the inner region 82 of the knob receiver 26. Accordingly, cleaning of the front surface 34 of the front panel 22 without being able to remove the knob 10 from the knob receiver 26 can be conveniently accomplished in an efficient manner.

The invention disclosed herein is further summarized in the following paragraphs and is further characterized by combinations of any and all of the various aspects described therein.

According to another aspect of the present disclosure, an appliance console includes a panel having a knob receiver, an encoder that is attached to a back side of the panel and extends through the panel to partially define the knob receiver, and a knob having a perimeter wall and a central hub. The central hub attaches to the knob receiver. The knob is rotationally operable and axially fixed relative to the knob receiver. Engagement of the knob receiver with the central hub prevents detachment of the knob from the knob receiver, the knob receiver is further defined by a rib that projects from a front surface of the panel, and the perimeter wall and the rib cooperate to define a flow path that directs fluid around the knob receiver and to an area below the rib. Further, the rib and the perimeter wall cooperate to prevent infiltration of the fluid into the knob receiver.

According to another aspect, the knob receiver includes an aperture through which the encoder extends to receive the knob.

According to another aspect, the central hub of the knob includes an attachment structure that extends through the aperture to axially secure the knob to the knob receiver.

According to another aspect, the rib includes an angled outer surface that promotes the flow of the fluid toward an area of the panel outside the rib of the knob receiver.

According to another aspect, the encoder is coupled with a printed circuit board, and wherein the attachment structure of the knob is positioned between the printed circuit board and the back side of the panel.

According to another aspect, the back side of the panel includes a receptacle that secures the printed circuit board to the panel.

According to another aspect, the attachment structure of the knob includes an outer portion that engages the aperture, wherein the outer portion defines a plurality of resilient tabs that attach to the aperture of the knob receiver.

According to another aspect, the attachment structure of the knob includes an inner portion that receives the encoder, wherein the inner portion of the attachment structure is axially and rotationally fixed to an encoder shaft of the encoder.

According to another aspect, a weighted disk is attached to an underside of the knob and positioned between the perimeter wall and the central hub, wherein the weighted disk is positioned proximate a top edge of the rib to further prevent infiltration of the fluid into the knob receiver.

According to another aspect, the weighted disk is configured to increase the inertia of the knob.

According to another aspect, the inner portion further includes supplemental tabs that secure the weighted disk to the underside of the knob.

According to another aspect of the present disclosure, a console for an appliance includes a panel having an aperture, an encoder that is attached to a back side of the panel, and a knob that includes a central hub that is attached to the encoder and the panel. The knob is rotationally operable and axially positioned relative to the panel. Engagement of the central hub of the knob with at least one of the encoder and the panel prevents detachment of the knob from the panel, the knob includes a perimeter wall, the panel includes a rib that projects from a front surface of the panel, and the perimeter wall and the rib cooperate to define a labyrinth seal that prevents infiltration of fluid onto an area of the panel between the rib and the aperture.

According to another aspect, the rib includes an angled outer surface that promotes the flow of the fluid toward an area of the panel outside of the rib.

According to another aspect, the encoder is coupled with a printed circuit board, and wherein the central hub of the knob includes a plurality of resilient tabs that attach to the aperture, wherein the plurality of resilient tabs are positioned between the printed circuit board and the back side of the panel.

According to another aspect, the back side of the panel includes a receptacle that secures the printed circuit board to the panel.

According to another aspect, a weighted disk is attached to an underside of the knob and positioned between the perimeter wall and the central hub, wherein the weighted disk is positioned proximate a top edge of the rib to further prevent infiltration of the fluid into the aperture.

According to yet another aspect of the present disclosure, an appliance console includes a panel having an aperture, an encoder that is attached to a back side of the panel and extends through the aperture, a knob having a perimeter wall and a central hub, and a weighted disk. The central hub receives the encoder and is axially secured to the aperture. The knob is rotationally operable relative to the panel for operating the encoder. The weighted disk is attached to the knob between the perimeter wall and the central hub to increase the inertia of the knob. The panel includes a rib that projects from a front surface of the panel, and the perimeter wall and the rib cooperate to define a flow path that directs fluid around the perimeter wall and to an area below the perimeter wall and prevents infiltration of the fluid onto an area of the panel between the rib and the aperture.

According to another aspect, the rib includes an angled outer surface that promotes the flow of the fluid toward an area of the panel outside of the rib.

According to another aspect, the encoder is coupled with a printed circuit board, and wherein the central hub of the knob includes a plurality of resilient tabs that attach to the aperture, wherein the plurality of resilient tabs are positioned between the printed circuit board and the back side of the panel.

According to another aspect, the back side of the panel includes a receptacle that secures the printed circuit board to the panel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance console comprising:
- a panel having a knob receiver;
- an encoder that is attached to a back side of the panel and extends through the panel to partially define the knob receiver; and
- a knob having a perimeter wall and a central hub, wherein the central hub attaches to the knob receiver, wherein the knob is rotationally operable and axially fixed relative to the knob receiver, wherein:
  - engagement of the knob receiver with the central hub prevents detachment of the knob from the knob receiver;
  - the knob receiver is further defined by a rib that projects from a front surface of the panel; and
  - the perimeter wall and the rib cooperate to define a flow path that directs fluid around the knob receiver and to an area below the rib, wherein the rib and the perimeter wall cooperate to prevent infiltration of the fluid into the knob receiver, wherein:
  - the knob receiver includes an aperture through which the encoder extends to receive the knob;
  - the central hub of the knob includes an attachment structure that extends through the aperture to axially secure the knob to the knob receiver;
  - the encoder is coupled with a printed circuit board, and the attachment structure of the knob is positioned between the printed circuit board and the back side of the panel; and
  - the back side of the panel includes a receptacle that secures the printed circuit board to the panel.

2. The appliance console of claim 1, wherein the rib includes an angled outer surface that promotes the flow of the fluid toward an area of the panel outside the rib of the knob receiver.

3. The appliance console of claim 1, wherein the attachment structure of the knob includes an outer portion that engages the aperture, wherein the outer portion defines a plurality of resilient tabs that attach to the aperture of the knob receiver.

4. The appliance console of claim 3, wherein the attachment structure of the knob includes an inner portion that receives the encoder, wherein the inner portion of the attachment structure is axially and rotationally fixed to an encoder shaft of the encoder.

5. The appliance console of claim 1, further comprising:
- a weighted disk that is attached to an underside of the knob and positioned between the perimeter wall and the central hub, wherein the weighted disk is positioned proximate a top edge of the rib to further prevent infiltration of the fluid into the knob receiver.

6. The appliance console of claim 5, wherein the weighted disk is configured to increase the inertia of the knob.

7. The appliance console of claim 5, wherein the attachment structure of the knob includes an inner portion that receives the encoder, and wherein the inner portion further includes supplemental tabs that secure the weighted disk to the underside of the knob.

8. A console for an appliance, the console comprising:
- a panel having an aperture;
- an encoder that is attached to a back side of the panel;
- a knob that includes a central hub that is attached to the encoder and the panel; and
- a weighted disk that is attached to an underside of the knob, wherein:
  - the knob is rotationally operable and axially positioned relative to the panel;
  - engagement of the central hub of the knob with at least one of the encoder and the panel prevents detachment of the knob from the panel;
  - the knob includes a perimeter wall;
  - the panel includes a rib that projects from a front surface of the panel;
  - the perimeter wall and the rib cooperate to define a labyrinth seal that prevents infiltration of fluid onto an area of the panel between the rib and the aperture; and
  - the weighted disk is positioned between the perimeter wall and the central hub and is positioned proximate a top edge of the rib to further prevent infiltration of the fluid into the aperture.

9. The console of claim 8, wherein the rib includes an angled outer surface that promotes the flow of the fluid toward an area of the panel outside of the rib.

10. The console of claim 8, wherein the encoder is coupled with a printed circuit board, and wherein the central hub of the knob includes a plurality of resilient tabs that attach to the aperture, wherein the plurality of resilient tabs are positioned between the printed circuit board and the back side of the panel.

11. The console of claim 10, wherein the back side of the panel includes a receptacle that secures the printed circuit board to the panel.

12. The console of claim 8, wherein the central hub of the knob includes an attachment structure having an inner portion that receives the encoder, wherein the inner portion of the attachment structure is axially and rotationally fixed to an encoder shaft of the encoder.

13. The console of claim 8, wherein the weighted disk is configured to increase the inertia of the knob.

14. The console of claim 12, wherein the inner portion further includes supplemental tabs that secure the weighted disk to the underside of the knob.

15. The console of claim 8, wherein the weighted disk is positioned proximate a top edge of the rib to further prevent infiltration of the fluid into the aperture.

16. An appliance console comprising:

a panel having an aperture;

an encoder that is attached to a back side of the panel and extends through the aperture;

a knob having a perimeter wall and a central hub, wherein the central hub receives the encoder and is axially secured to the aperture, the knob being rotationally operable relative to the panel for operating the encoder; and a weighted disk that is attached to the knob between the perimeter wall and the central hub to increase the inertia of the knob, wherein the panel includes a rib that projects from a front surface of the panel;

the perimeter wall and the rib cooperate to define a flow path that directs fluid around the perimeter wall and to an area below the perimeter wall and prevents infiltration of the fluid onto an area of the panel between the rib and the aperture;

the encoder is coupled with a printed circuit board, and the central hub of the knob includes a plurality of resilient tabs that attach to the aperture; and the plurality of resilient tabs are positioned between the printed circuit board and the back side of the panel.

17. The appliance console of claim 16, wherein the rib includes an angled outer surface that promotes the flow of the fluid toward an area of the panel outside of the rib.

18. The appliance console of claim 16, wherein the back side of the panel includes a receptacle that secures the printed circuit board to the panel.

19. The appliance console of claim 16, wherein the central hub of the knob includes an attachment structure having an inner portion that receives the encoder, wherein the inner portion of the attachment structure is axially and rotationally fixed to an encoder shaft of the encoder.

20. The appliance console of claim 19, wherein the inner portion further includes supplemental tabs that secure the weighted disk to the underside of the knob.

* * * * *